United States Patent [19]
Vinegar et al.

[11] Patent Number: 4,769,606
[45] Date of Patent: Sep. 6, 1988

[54] INDUCED POLARIZATION METHOD AND APPARATUS FOR DISTINGUISHING DISPERSED AND LAMINATED CLAY IN EARTH FORMATIONS

[75] Inventors: Harold J. Vinegar; Monroe H. Waxman, both of Houston, Tex.

[73] Assignee: Shell Oil Company, Houston, Tex.

[21] Appl. No.: 913,441

[22] Filed: Sep. 30, 1986

[51] Int. Cl.$^4$ ............................................. G01V 11/00
[52] U.S. Cl. .................................... 324/366; 324/341; 324/362; 324/376; 324/303; 250/256; 250/269
[58] Field of Search ............... 324/357, 360, 362, 376, 324/354, 347, 303; 73/152; 250/256, 269

[56] References Cited

U.S. PATENT DOCUMENTS

| | | | |
|---|---|---|---|
| 4,236,113 | 11/1980 | Wiley | 324/366 |
| 4,464,930 | 8/1984 | Givens | 324/366 X |
| 4,467,642 | 8/1984 | Givens | 324/362 X |
| 4,644,283 | 2/1987 | Vinegar et al. | 324/376 |

Primary Examiner—Reinhard J. Eisenzopf
Assistant Examiner—Warren S. Edmonds

[57] ABSTRACT

Logging means and methods are disclosed for distinguishing between dispersed and laminated clay in earth formations. A wireline apparatus is employed consisting of a multifrequency induced polarization logging tool operating at extremely low frequencies, combined with other logging tools which measure the total amount of clay in the formation. A determination is then made of the fraction of the total clay content in the formation which is due to laminated clay.

43 Claims, 2 Drawing Sheets

FIG. 1
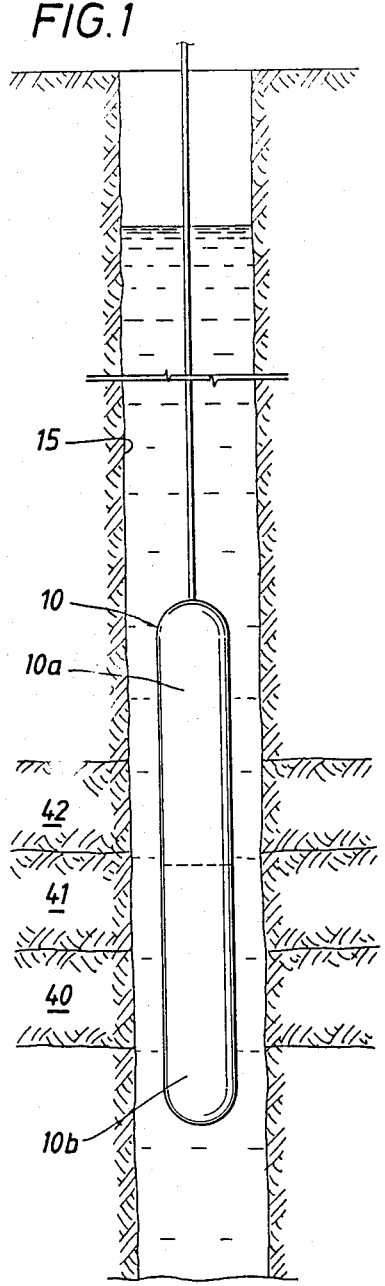
FIG. 2A STRUCTURAL CLAY
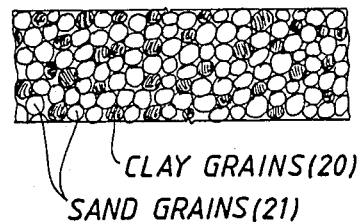
FIG. 2B DISPERSED CLAY
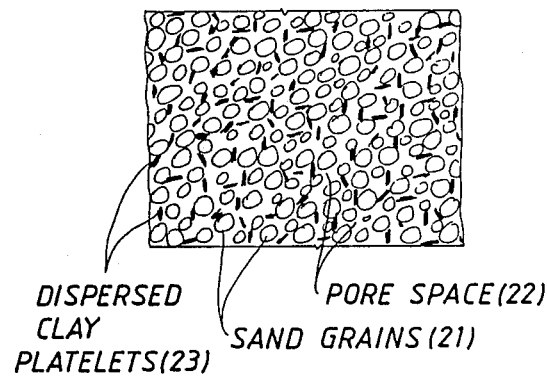
FIG. 2C LAMINATED CLAY
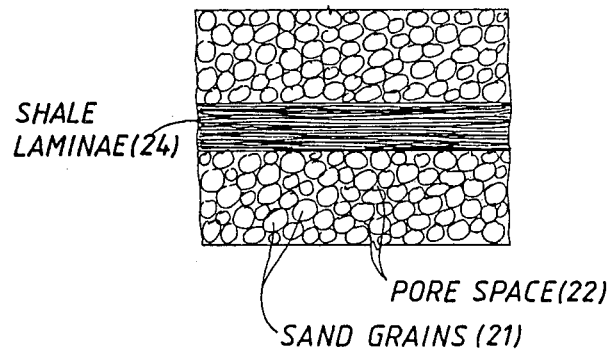

INDUCED POLARIZATION METHOD AND APPARATUS FOR DISTINGUISHING DISPERSED AND LAMINATED CLAY IN EARTH FORMATIONS

BACKGROUND OF THE INVENTION

This invention relates to logging an earth formation to determine the producibility of hydrocarbons contained in that formation. In particular, this invention discloses a means and method for measuring the separate amounts of dispersed and laminated clay in an earth formation.

In well logging one frequently encounters clay minerals contained in sandstone formations. These clay minerals are found in three basic morphologies: dispersed (also called disseminated) clay, laminated clay (also called laminated shale), and structural clay. In the case of dispersed clay, the clay minerals are dispersed throughout the pore space and occupy part of that pore space. Typically, the clay minerals randomly coat the sand grain surfaces with separate, discrete clay particles. This type of clay morphology is usually formed between the sand grains after the sandstone matrix has been deposited. In the case of laminated clay, the clay is usually deposited as a continuous geological layer between geological layers of sand. The clay layers are then subjected to compaction over geological time. These clay laminae are spatially continuous over large distances and can vary in thickness from several microns to many feet thick. Laminated clay also fills the pore space and replaces the matrix proportionally to their volume. The third clay morphology, structural clay, is much less common. Structural clay replaces individual sand grains in the matrix.

The type of clay distribution to a large degree determines the effective porosity, permeability, and productivity of shaly reservoirs. In sufficient quantity, clays can have a serious deleterious effect on the performance of a petroleum reservoir. One important reason for distinguishing between dispersed and laminated clay is the fact that laminated clay is often found between strata of clean (i.e. clay-free) sand. The thickness (thinness) of the laminations may be such that standard logging tools fail to resolve the clay laminations and only a net response from the average clay content from both clean sand and laminated clay is observed. The average clay content can be so large that, if it were dispersed, the petrophysicist would reach a pessimistic conclusion about the producibility of the reservoir; whereas, in fact, the clay-free sand between the clay laminations may have excellent productivity for hydrocarbons. Another advantage of distinguishing between dispersed and laminated clay is that this leads to a recalculation of the hydrocarbon saturation, because hydrocarbons are almost always contained within the sandstone and not within the laminated shale.

SUMMARY OF THE INVENTION

In the present invention, a method and apparatus are taught which can readily distinguish between such dispersed and laminated clays, even while logging in real time within a borehole. A multifrequency Induced Polarization logging tool operating at sufficiently low frequencies, typically less than 1 Hz, is combined with one or more additional logging tools that measure total clay content in the earth formation of interest. As explained more fully herein, at these low frequencies the Induced Polarization logging tool responds only to the dispersed clay content contained in the formation, and the induced polarization response to laminated clay layers in the formation is substantially equal to zero. For measuring total clay content, any of the following logging tools, for example, can be used: an SP (Spontaneous Potential) log, a Natural Gamma Ray log, an NML log (Nuclear Magnetism Log), or a multifrequency Dielectric Log operating in the frequency range between approximately 1 and 300 MHz.

Responses of the Induced Polarization log and total clay log (or logs) are combined in appropriate equations to determine the fraction of total clay content due to laminated clay (or shale), and hence, the dispersed clay content in the productive portion of the earth formation.

In the preferred embodiment, the present invention can thus provide real-time formation analysis, while logging within a borehole, of the clay in the earth formations which are penetrated by the borehole. The invention makes a sensitive and accurate differentiation between dispersed and laminated clay in these formations, without having to take actual samples (cores) and bring them to the surface for analysis. In fact, as taught herein, the induced polarization logging tool is the only logging tool known to have the capability of responding differently to dispersed and laminated clays and therefore of quantifying their relative amounts, thus making the present invention extremely valuable for such applications. Further, the broad versatility of the present invention is such that it can also be used in a laboratory, or elsewhere, at the earth's surface. For example, a core previously taken from an earth formation and brought to the surface can then be measured by induced polarization and the results combined with suitably derived total clay measurements for distinguishing between the dispersed and laminated clay in the formation from which the core sample was taken.

It is therefore an object of the present invention to provide an improved method and apparatus for distinguishing dispersed and laminated clay in earth formations; such a method and apparatus which can be used easily and economically not only at the earth's surface, but also on a real-time basis while logging earth formations within a borehole which penetrates through those formations; which provides for measuring an earth formation of interest by means of induced polarization; which also measures the total amount of clay in the same earth formation; which combines the results of the induced polarization and total clay measurements to determine the fraction of the total clay content in the formation which is due to laminated clay; which, in a preferred embodiment, teaches how to measure the separate amounts of dispersed and laminated clay using multifrequency induced polarization logging tools, such as those disclosed in U.S. Pat. Nos. 4,359,687, issued Nov. 16, 1982 (Vinegar, H. J. and Waxman, M. H.), 4,583,046, issued Apr. 15, 1986 (Vinegar, H. J. and Waxman, M. H.), and U.S. Application Ser. No. 815,322, filed Dec. 31, 1985 (Vinegar, H. J. and Waxman, M. H.), all assigned to the assignee of the present invention; and to accomplish the above objects and purposes in an inexpensive, uncomplicated, durable, versatile, and reliable method and apparatus readily suited to the widest possible utilization in the analysis of clays in potentially hydrocarbon bearing earth formations.

These and other objects and advantages of the invention will be apparent from the following description, the accompanying drawings, and the appended claims.

BRIEF DESCRIPTION OF THE DRAWINGS

The invention will be better understood with the aid of the following figures in which:

FIG. 1 shows a combination logging tool which combines an induced polarization logging tool with a total clay logging tool.

FIG. 2 shows a schematic of an earth formation, comparing the cases of dispersed, laminated, and structural clay.

DESCRIPTION OF THE PREFERRED EMBODIMENT

Figure 3:
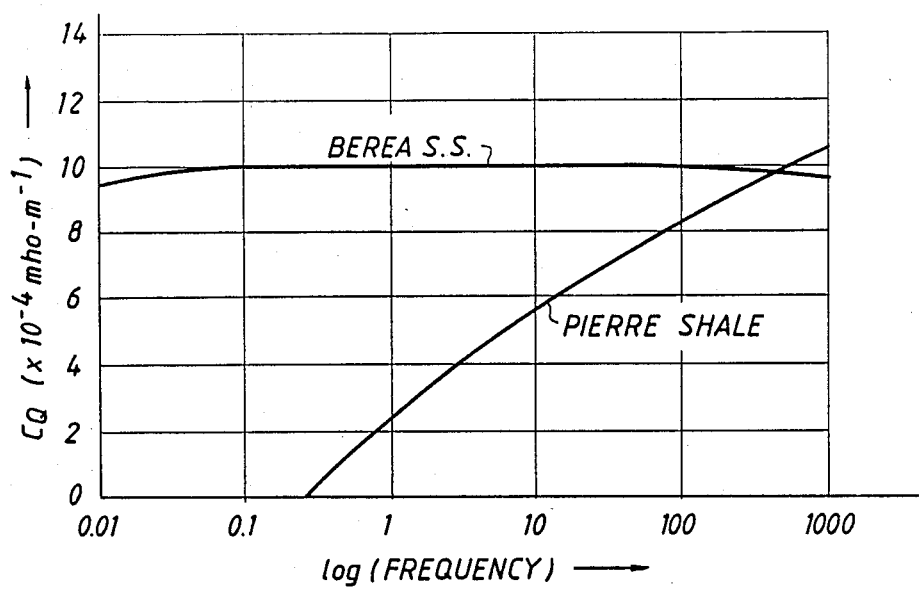
FIG. 3 shows the induced polarization quadrature conductivity versus frequency of a Pierre shale and a Berea sandstone.

With reference to the drawings the new and improved means for distinguishing dispersed and laminated clay in an earth formation, and the method therefor according to the present invention, will now be explained. FIG. 1 shows a logging tool 10 disposed opposite various earth formations 40, 41, and 42 in a borehole 15. As explained further herein, tool 10 may be a single tool, or it may be a string of several tools 10a, 10b (etc.), as is customary in the art. In conventional manner, tool 10 is moved to several depths within borehole 15, and the measurements it makes may be recorded to produce a log thereof.

FIG. 2A illustrates the first of the three basic types of clay distribution, known as structural clay. Here the clay 20 has replaced individual sand grains 21.

Referring to FIG. 2B, the dispersed clay type of distribution is shown. Here, sand grains 21 form a porous and permeable sandstone. Brine in the pore space has over geological time contained the ions necessary for the growth of the dispersed clay minerals 23 which grow on the sand grains into the pore space. Typical clay minerals found in the dispersed state in earth formations are montmorillonite, illite, chlorite, and kaolinite. In sufficient quantity, these minerals can be deleterious to the permeability and producibility of the earth formation.

By contrast, FIG. 2C shows laminated clay, in which clean sand grains 21 alternate with thin clay laminae 24.

The total amount of clay contained in these cases may be identical. However, the dispersed clay case (FIG. 2B) may have very poor reservoir performance while the laminated clay/clean sand package (FIG. 2C) may have excellent reservoir performance.

When the thickness of the clay laminae 24 is very small compared to the vertical resolution of the logging tool 10, the clay laminae are not resolved as separate geological strata but rather an average clay content is measured by the logging tool.

The quadrature conductivity response versus frequency of an earth formation containing dispersed clay (Berae sandstone) is compared in FIG. 3 with one consisting of entirely laminated shale (Pierre shale). At sufficiently low frequencies, typically less than 1 Hz, the induced polarization response of laminated clay decreases substantially to zero. In contrast, the dispersed clay generates a substantially freqency independent quadrature conductivity to considerably lower frequencies. Thus, at sufficiently low frequencies, the only induced polarization response is due to dispersed clay.

The explanation of the different induced polarization behavior of dispersed and laminated shale is the following. Quadrature conductivity in shaly sands is due to a membrane potential mechanism and the presence of clay-rich and clay-poor zones, alternating in the pore space of the rock. When current is applied during the course of the induced polarization measurement, local electrolyte excesses and deficiencies develop about the clay sites, leading to a series of alternating electrolyte excesses and deficiencies throughout the pore spaces. Upon termination of the applied current, these localized concentration gradients decay with time and the ions redistribute themselves to their original equilibrium distributions. Quadrature conductivity responses result from these concentration changes.

In order for this to occur, there must be regions which are substantially clay-rich and regions substantially clay-free, such as are found in formations containing dispersed clay among the sand grains. The random distribution of the distances between clay platelets in the dispersed case leads to substantially frequency-independent behavior of the quadrature conductivity.

In contrast, for laminated shale there are continuous clay layers so that localized concentration excesses and deficiencies do not develop on the distance scale of 30 microns which corresponds to frequencies near 1 Hz. At much higher frequencies, however, the distance between charge sites within the clay laminations becomes important and induced polarization does develop at much higher frequencies. The quadrature conductivity of laminated shale is thus frequency dependent and decreases substantially to zero at frequencies below 1 Hz.

FIG. 1 thus shows an induced polarization logging tool 10b such as that disclosed in U.S. Pat. Nos. 4,359,687 and 4,583,046, combined or run independently with a total clay content logging tool 10a. The induced polarization logging tool 10b is preferably a multifrequency tool in order to measure the frequency-dependent behavior of the laminated shale. In practice, the induced polarization log may be operated at a plurality of low frequencies opposite adjacent earth formations to determine a frequency low enough to suppress the response from laminated shales. The other logging tool may be a Spontaneous Potential log (SP), in which case it is already measured by the Induced Polarization logging tools of the above-mentioned U.S. Pat. Nos. 4,359,687 and 4,583,046, or it may be a Natural Gamma Ray log, a Natural Gamma Ray Spectroscopy log, a Neutron-Density Combination log, a Nuclear Magnetism Log (NML), or a Multifrequency Dielectric Log. Each of these total clay logging tools responds to all the clay present in the formation, and does not distinguish between dispersed and laminated clay in strata smaller than their vertical resolutions. The response of many of these logs to total clay content has bee reviewed by L. J. S. Burck, in a paper entitled, "A Review of Log and Core Methods for Determining Cation Exchange Capacity/$Q_v$,", and published in the Transactions, Eighth European Formation Evaluation Symposium, Paper F, London Chapter, Society of Professional Well Log Analysts, London, England, Mar. 14–15, 1983.

The general equations describing quadrature conductivity in shaly sands have been derived by H. J. Vinegar and M. H. Waxman, "Induced Polarization of Shaly Sands", Geophysics, vol. 49, pages 1267–1287, August 1984. The analogous equations for the in-phase conductivity of these sands was given by M. H. Waxman and L. J. M. Smits, "Electrical Conductivities in Oil-Bearing Shaly Sands", Transactions AIME, vol. 243, Part II, pages 107–122, 1968. The equation for the quadrature conductivity, $C_Q'$, is:

$$C_Q' = \frac{S_w^{n*-1}}{F^*\phi} \lambda (Q_v)_T (1-f) \tag{1}$$

where $(Q_v)_T$ is the total clay exchange capacity per unit pore volume, resulting from the presence of all clay minerals in the formation of interest, both dispersed and laminated. That fraction of clay in the formation which is present in laminated form is f. Other parameters in equation (1) are: $F^*$ and $n^*$ are the formation resistivity factor and saturation exponent for the shaly sand, as defined by Waxman and Smits, $S_w$ is the fractional water saturation, $\phi$ is the formation porosity (fractional) as measured by conventional means on formation samples, or by the Density log in downhole logging runs, and $\lambda$ is the quadrature or out-of-phase equivalent conductivity of the clay exchange cations. Empirical values of $\lambda$ are given as functions of brine concentration and temperature by Vinegar and Waxman, in the above referenced publication. The authors have found that the quadrature conductivity at low enough frequency is contributed only by the dispersed clay.

The equation for the in-phase conductivity, $C_I'$, is:

$$C_I' = \frac{S_w^{n*}}{F^*}\left[C_w + \frac{B(Q_v)_T}{S_w}\right] \tag{2}$$

where $C_w$ is the in-phase conductivity of the brine contained in the pores of the formation, and B is the in-phase equivalent conductivity of the clay exchange cations. Values of B as a function of sodium chloride concentration are given by Waxman and Smits in the above referenced paper; the variation of B with temperature is disclosed by M. H. Waxman and E. C. Thomas, "Electrical Conductivities in Shaly Sands: I. Relation Between Hydrocarbon Saturation and Resistivity Index. II. The Temperature Coefficient of Electrical Conductivity", Transactions AIME, vol. 257, Part I, pages 213–225, 1974. According to the present invention it has been found that dispersed and laminated clay have approximately equal effect on the in-phase conductivity. Thus, the in-phase conductivity responds to $(Q_v)_T$ and the total cation exchange capacity, as shown in equation (3) (below).

The clay or shaliness parameter $(Q_v)_T$ describing the effective clay contributions from both dispersed and laminated clays is:

$$(Q_v)_T = \frac{(CEC)_T \rho_M (1-\phi)}{\phi} \tag{3}$$

where $(CEC)_T$ is the total cation exchange capacity of the formation on a dry weight basis, including both dispersed and laminated clay fractions, and $\rho_M$ is the rock matrix grain density (usually taken as 2.65 g/cc for sandstone). It, of course, follows that the clay parameter pertaining to the dispersed clay fraction in the formation, $(Q_v)_{disp}$, is equal to $(Q_v)_T(1-f)$. If no hydrocarbons are present in the formation, and the formation brine conductivity is known or can be approximated, equations (1) and (2) are sufficient to solve for the two quantities $(Q_v)_T$ and f, that is, the total cation exchange capacity per unit pore volume, and the fraction of this which is laminated. However, if hydrocarbons are present, there is still a third unknown, and an additional equation for the total clay is required.

The additional equation for the total clay content depends on the logging tool used for this measurement. For the Self-Potential (SP) log, theoretical equations, verified by experiments, were published by L. J. M. Smits, "SP Log Interpretation in Shaly Sands", Transactions AIME, vol. 243, Part II, pages 123–136, 1968. These equations relate the net electrochemical component of the self-potential log (after correction for electrokinetic effects) to the algebraic sum of two diffusion potentials between shaly sand and adjacent shale beds. These are: $E_{shaly\,sand}$, resulting from the junction, mud filtrate/shaly sand/formation brine, and $E_{shale}$, from the junction, formation brine/shale/mud filtrate. Smits described the shaly sand diffusion or membrane potential, $E_{shaly\,sand}$, as a function of $(Q_v)_T$ of the shaly sand and the two electrolyte concentrations involved in logging practice, mud filtrate and formation brine. This equation was rearranged by E. C. Thomas, "The Determination of $Q_v$ from Membrane Potential Measurements on Shaly Sands", Journal Petroleum Technology, pages 1087–1096, September 1976, in order to facilitate computer calculations. The equation, including the emf contribution from silver-silver chloride measuring electrodes is:

$$E_{shaly\,sand} = -\frac{2RT}{F}\int_{m_1}^{m_2}\left[\frac{t_{Na}^{hf} + R_w B(Q_v)_T}{1 + R_w B(Q_v)_T}\right]d\ln m\gamma_{\pm} \tag{4}$$

Here T is temperature, F is the Faraday, R is the molar gas constant, $t_{Na}^{hf}$ is the Hittorf electrical transport number for the sodium ion in aqueous solution, also available from the literature, $R_w$ is the geometric mean water resistivity (equal to the reciprocal of water conductivity, $C_w$), m and $\gamma_{\pm}$ are the molality and mean ionic activity of the sodium chloride electrolyte solutions. The integration limits, $m_1$ and $m_2$, refer to molalities of mud filtrate and formation brine, respectively.

The remaining component of the electrochemical SP potential, $E_{shale}$, may be approximated from the well known Nernst potential, assuming perfect permselective membrane behavior by the shale:

$$E_{shale} = \frac{2RT}{F}\int_{m_2}^{m_1} d\ln m\gamma_{\pm} \tag{5}$$

The total clay parameter $(Q_v)_T$ may thus be calculated utilizing equations (4) and (5), the measured electrochemical component of the SP log opposite the formation of interest, and the concentrations or thermodynamic salt activities of the formation brine and mud filtrate. Charts have been presented by Smits in the cited publication to facilitate these calculations. The SP log has the further advantage that the SP measurement is already made by the induced polarization logging tools of the above-noted U.S. Pat. Nos. 4,359,687 and 4,583,046 and therefore additional logging tools may not be required.

However, it is often the case that other logging tools are also used, in addition to the resistivity logs. Then many of the corrections that are required for SP log interpretation are not required and greater accuracy can be obtained.

If the Natural Gamma Ray log is used, then $(Q_v)_T$ can be estimated from correlations between gamma ray response and clay cation exchange capacity. These correlations are largely due to the presence of potassium ($K^{40}$) in the clay mineral illite and to a lesser extent in kaolinite. Such examples are given by W. L. Johnson and W. A. Linke, "Some Practical Applications to Improve Formation Evaluation of Sandstones in the Mackenzie Delta", SPWLA Nineteenth Annual Logging Symposium, Paper C, El Paso, Tex., June 13-16, 1978. The following equation illustrates the use of such a relation:

$$(Q_v)_T = \frac{(a\gamma + b)\rho_M(1-\phi)}{\phi} \quad (6)$$

where $\gamma$ is the gamma ray deflection (API units) relative to a clay-free formation, $\phi$ is the porosity, usually obtained from a density log, and the constants a and b are calibrated from log or core data.

The use of Natural Gamma Ray Spectroscopy logs such as offered by Spectralog (Dresser) or NGT (Schlumberger) permits further improvement over the Natural Gamma Ray log, since it measures not only the total gamma ray counts, but also distinguishes emissions from specific nuclides of potassium ($K^{40}$), the uranium series ($Bi^{214}$), and the thorium series ($Th^{308}$). E. Frost, Jr. and W. H. Fertl have grouped the various clay minerals as to their relative potassium, uranium, and thorium concentrations in their paper, "Integrated Core and Log Analysis Concepts in Shaley Clastic Reservoirs", CWLS Seventh Formation Evaluation Symposium, Paper C, Calgary, Alberta, Canada, Oct. 21-24, 1979. Frost and Fertl established empirical correlations relating clay cation exchange capacity to thorium and $K^{40}$ concentrations, thus permitting determination of $(Q_v)_T$ by equations analogous to equation (6).

If the Nuclear Magnetism Log (NML) is used, the free-fluid index (FFI) response of this logging tool is due only to the free fluids (water and oil) within the pores. Water associated with clay minerals (bound water) has a very short transverse relaxation time $T_2$, typically less than 100 microseconds. This water is not seen by the NML because the recorded NML signal begins approximately 20 milliseconds after switching off the polarizing magnetic field. Since the NML does not measure the water associated with either dispersed or laminated clays, the free-fluid index will be less than or equal to the total porosity. The NML will also not respond to fluids contained in pore spaces much less than one micron is diameter, due to their very short spin lattice relaxation time $T_1$; however, in typical sandstones and siltstones, most of the porosity is contained in pores greater than one micron. Thus the major cause for the free-fluid index to be less than total porosity is the presence of clay minerals, and the difference between NML FFI and Density Log porosity represents the porosity filled with clay-bound water. $(Q_v)_T$ can be computed from this clay-bound water using suitable laboratory or log correlations, such as that of H. J. Hill, O. J. Shirley, and G. E. Klein, edited by M. H. Waxman and E. C. Thomas, "Bound Water in Shaly Sands—its Relation to $Q_v$ and Other Formation Properties," The Log Analyst, Vol. XX, No. 3, May-June, 1979:

$$V_s/V_p = (0.084 \, C_0^{-\frac{1}{2}} + 0.22)(Q_v)_T \quad (7)$$

where $V_s/V_p$ is the volume of bound water per unit total pore volume, and $C_0$ is the NaCl concentration in the brine in equivalents/liter.

The difference between Neutron and Density log responses opposite a formation containing clay minerals is another useful total clay indicator and well known to those skilled in the art. The Density log responds to all the water in the formation; hence the Density log porosity, $\phi_D$, is identical to porosities obtained by conventional laboratory methods, including a drying operation at 105° C., i.e., $\phi_D = \phi$, as cited in equations (3) and (6). In addition, however, the Neutron log also responds to hydrogen atoms contained in the crystal lattices of the clay minerals. Thus, the difference between these two log responses, $(\phi_N - \phi_D)$, where $\phi_N$ is the Neutron log porosity, is the incremental hydrogen index ($\Delta HI$) resulting from the total clay mineral content present in the formation. If gas or condensate is present in the pore space of the reservoir, well known corrections must be applied to Neutron and Density log responses.

This approach has been formulated by I. Juhasz, "The Central Role of $Q_v$ and Formation Water Salinity in the Evaluation of Shaly Formations", Paper AA, SPWLA Twentieth Annual Logging Symposium, Tulsa, Okla., June 3-6, 1979, with the equation:

$$(Q_v)_T = \frac{\phi_N - \phi_D}{\phi_D} \cdot C \quad (8)$$

C is a calibration constant given by the equation:

$$C = \frac{(CEC)_{T,dry} \cdot (\rho_{clay,dry})}{HI_{clay,dry}} \quad (9)$$

where $(CEC)_{T,dry}$ is the cation exchange capacity of the total clay mineral mixture in the formation in dry form, $\rho_{clay,dry}$ and $HI_{clay,dry}$ are the density and hydrogen index, respectively, of the dry clay mineral mixture in the formation. The constant C is calibrated from log and core data.

In addition, if a multifrequency Dielectric logging tool is used, the dispersion of the dielectric constant between two frequencies in the range 1-300 MHz can be used as a measure of total clay content, $(Q_v)_T$, in both dispersed and laminated morphologies.

All of these logging tools, Induction and Resistivity logs, the Spontaneous Potential (SP) log, the Natural Gamma Ray log, the Natural Gamma Ray Spectroscopy log, the Neutron-Density combination logs, the Nuclear Magnetism Log (NML), and the multifrequency Dielectric log (in the 1-300 MHz frequency range) have been found to measure total clay content, $(Q_v)_T$, independent of the dispersed or laminated state. However, as taught by the present invention, only the multifrequency Induced Polarization log, operating at extremely low frequencies, is capable of responding differently to dispersed and laminated clay minerals in the earth formation.

Three equations are required to solve for three unknowns. In the preferred embodiment, the unknowns are $(Q_v)_T$, which tells the total cation exchange capacity per unit pore volume of the earth formation, $S_w$, which is the water saturation, and therefore tells the oil saturation $S_o=1-S_w$, and f, which is the fraction of clay which is laminated. The fraction of dispersed clay is, of course, $1-f$. The three equations employed in the determination of the above unknowns are equation (1), with the formation quadrature conductivity, $C_Q'$, obtained from the multifrequency Induced Polarization tool, equation (2), with the in-phase formation conductivity, $C_I'$, obtained from Resistivity or Induction logs, and equation (3), with $(Q_v)_T$ obtained directly from core measurements or from downhole log responses, using one or more of the various logging tools cited above. Such alternate forms of equation (3) are the equations (4) and (5), telling the algebraic sum of $E_{shaly\ sand}$ and $E_{shale}$ which is the electrochemical component of the SP log response, equation (6), based on the Natural Gamma Ray log response, variants of equation (6) based on the Natural Gamma Ray Spectroscopy log thorium-potassium responses, and equations (8) and (9), based on Neutron-Density log responses. Other downhole logging tool responses which reflect total clay content, such as the Nuclear Magnetism Log (NML) and the multifrequency Dielectric tool, yield empirical expressions for $(Q_v)_T$ and fall within the scope of this invention.

Figure 4:
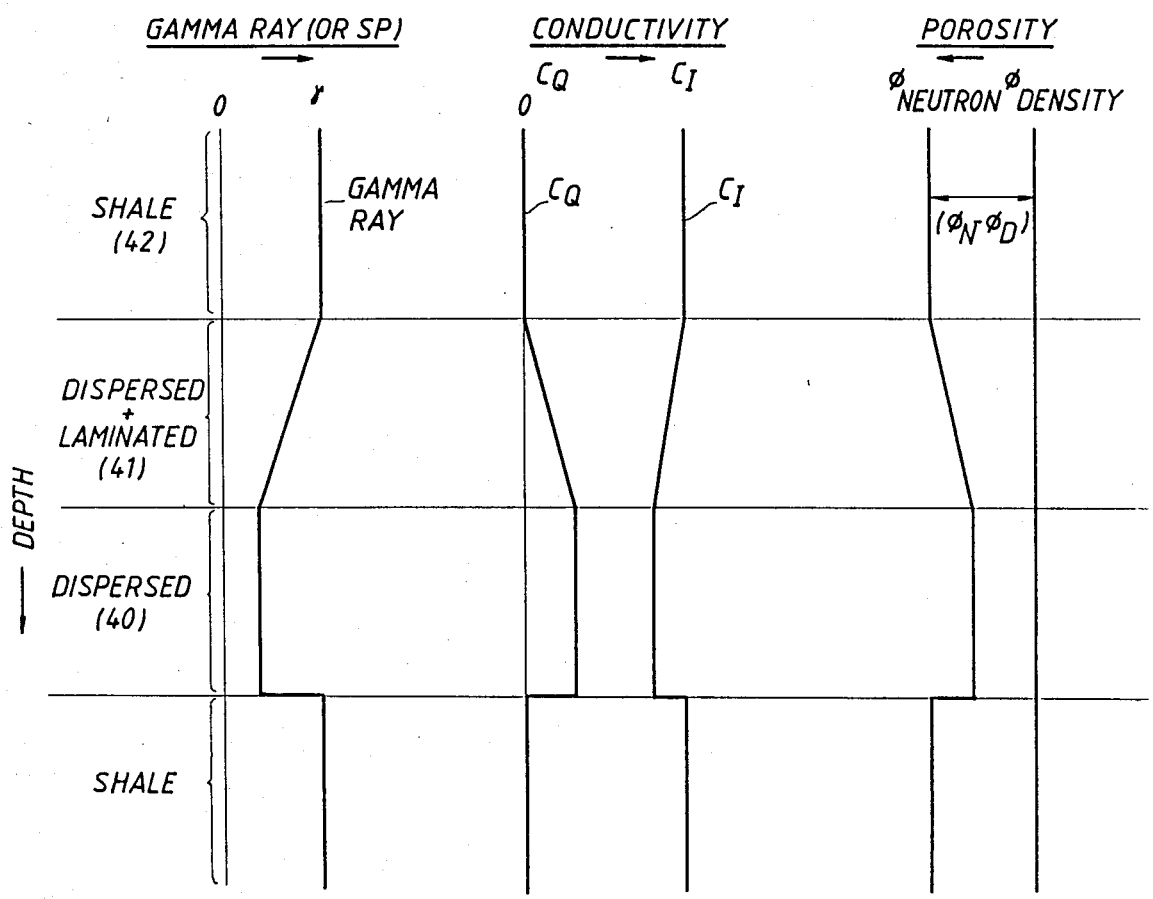
FIG. 4 shows a example of an induced polarization well log combined with a natural gamma ray well log and a density/neutron well log for an earth formation where the clay morphology changes from dispersed to laminated clay.

FIG. 4 shows a schematic example of the use of this invention in an earth formation which varies from dispersed clay to laminated clay morphology. In the zone labeled (40) the quadrature conductivity, gamma ray, and neutron-density log difference track each other. This shows dispersed clay behavior. In the zone labeled (41), which, for purposes of illustration shows a smooth transition from zone (40) to zone (42), the in-phase conductivity, gamma ray log, and the neutron-density difference all show increasing total clay, while the quadrature conductivity shows a decreasing response. Finally, in the shale zone (42), the in-phase conductivity, gamma ray and neutron-density porosity difference is largest, while the quadrature conductivity shows zero response. The shale in this zone is therefore totally laminated.

The output display from this invention may consist of a well log with three tracks showing $Q_v$, $S_w$, and f.

As may be seen, therefore, the present invention has numerous advantages. Principally, it can be used to provide real-time analysis, while logging within a borehole, of the clay in the earth formations penetrated by the borehole. A sensitive and accurate differentiation is made between dispersed and laminated clay in such formations, without having to take actual samples (cores) and bring them to the surface for analysis. Significantly, the versatility of the invention is such that, although its greatest value is presently believed to be in use in such borehole environments, it can also be used, for example, in a laboratory or elsewhere at the earth's surface. Thus, for example, a core previously brought to the surface can be measured by induced polarization, and the results combined with suitably derived total clay measurements (e.g., by logging measurements as taught above, or by laboratory measurements, etc.), and the dispersed and laminated clay then distinguished according to the invention. Further, the induced polarization measurements may be initially made in the time domain, subsequently transforming them to the frequency domain (e.g., by Fourier transform), as may be desired for the particular formation analysis.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for distinguishing dispersed and laminated clay in earth formations, comprising:
   measuring the dispersed clay content of at least a portion of such an earth formation by means of an induced polarization measurement;
   measuring the total amount of clay in the same earth formation; and
   combining the results of said induced polarization measurement and said total clay measurement to determine the fraction of the total clay content in the formation which is due to laminated clay.

2. The method of claim 1 wherein said step of measuring the dispersed clay content of the earth formation further comprises measuring the earth formation in a borehole which penetrates the formation, the measurement being performed with an induced polarization logging tool.

3. The method of claim 1 wherein said step of measuring the total amount of clay in the earth formation further comprises, with a borehole logging tool, measuring the clay in a borehole which penetrates the formation.

4. The method of claim 1 wherein said step of measuring the dispersed clay content of the earth formation further comprises measuring a core sample of the earth formation by means of induced polarization measurements.

5. The method of claim 1 wherein said step of measuring the total amount of clay in the earth formation further comprises measuring the clay in a core sample of the earth formation.

6. The method of claim 1 wherein said step of induced polarization measurement further comprises making multifrequency induced polarization measurements.

7. The method of claim 6 further comprising making induced polarization measurements in the frequency domain.

8. The method of claim 7 further comprising making induced polarization measurements in the frequency domain with a multifrequency frequency domain induced polarization logging tool operated at at least one frequency less than 1 Hz.

9. The method of claim 6 further comprising making induced polarization measurements in the time domain.

10. The method of claim 9 further comprising transforming said time domain induced polarization measurements to the frequency domain.

11. The method of claim 1 wherein said step of measuring the total amount of clay in the earth formation further comprises measuring the clay with a spontaneous potential (SP) tool.

12. The method of claim 11 further comprising measuring the total amount of clay in the earth formation using the equations:

$$E_{shaly\ sand} = -\frac{2RT}{F} \int_{m_1}^{m_2} \left[ \frac{t_{Na}^{hf} + R_w B(Q_v)_T}{1 + R_w B(Q_v)_T} \right] d\ln m\gamma_{\pm}$$

and

-continued $$E_{shale} = \frac{2RT}{F} \int_{m_2}^{m_1} d \ln m\gamma_\pm$$

where
- E = diffusion potential between sand/shaly sand and adjacent shale beds,
- T = temperature,
- F = the Faraday,
- R = molar gas constant,
- $t_{Na}^{hf}$ = Hittorf electrical transport number for sodium ion in aqueous solution,
- $R_w$ = geometric mean water resistivity (equal to the reciprocal of water conductivity, $C_w$),
- m and $\gamma_\pm$ = molality and mean ionic activity of sodium chloride electrolyte solutions,
- $m_1$ and $m_2$ = molalities of mud filtrate and formation brine, respectively,
- B = in-phase equivalent conductivity of the clay exchange cations, and
- $(Q_v)_T$ = total clay exchange capacity per unit pore volume.

13. The method of claim 1 wherein said step of measuring the total amount of clay in the earth formation further comprises measuring the clay using a Natural Gamma Ray log.

14. The method of claim 13 further comprising measuring the total amount of clay in the earth formation using the equation:

$$(Q_v)_T = \frac{(a\gamma + b)\rho_M(1 - \phi)}{\phi}$$

where
- $(Q_v)_T$ = total clay exchange capacity per unit pore volume,
- $\gamma$ = gamma ray deflection (API units) relative to clay-free formation,
- $\phi$ = porosity,
- a and b = constants calibrated from log or core data, and
- $\rho_M$ = rock matrix grain density.

15. The method of claim 1 wherein said step of measuring the total amount of clay in the earth formation further comprises measuring the clay using a Natural Gamma Ray Spectroscopy log.

16. The method of claim 1 wherein said step of measuring the total amount of clay in the earth formation further comprises measuring the clay using the difference between neutron and density logs.

17. The method of claim 16 further comprising measuring the total amount of clay in the earth formation using the equation:

$$(Q_v)_T = \frac{\phi_N - \phi_D}{\phi_D} \cdot C$$

where
- $(Q_v)_T$ = total clay exchange capacity per unit pore volume,
- $\phi_N$ = Neutron log porosity,
- $\phi_D$ = Density log porosity,
- C is a calibration constant given by the equation:

$$C = \frac{(CEC)_{T,dry} \cdot (\rho_{clay,dry})}{HI_{clay,dry}}$$

- $(CEC)_{T,dry}$ = cation exchange capacity of the total clay mineral mixture in the formation in dry form, and
- $\rho_{clay,dry}$ and $HI_{clay,dry}$ = density and hydrogen index, respectively, of the dry clay mineral mixture in the formation.

18. The method of claim 1 wherein said step of measuring the total amount of clay in the earth formation further comprises measuring the clay using the dispersion of the dielectric constant between two different frequencies.

19. The method of claim 18 further comprising determining the dispersion of the dielectric constant between the two different frequencies using a multifrequency dielectric logging tool operating in the frequency range between substantially 1 and 300 MHz.

20. The method of claim 1 further comprising performing said steps at a plurality of depths in a borehole which penetrates the formation.

21. The method of claim 1 further comprising recording the results of said combining step to produce a log thereof.

22. A method for distinguishing and separately measuring dispersed and laminated clay in earth formations penetrated by a borehole, comprising:
measuring the dispersed clay content of a portion of a borehole by logging the portion of the borehole with a multifrequency frequency domain induced polarization logging tool operated at at least one frequency less than 1 Hz;
measuring the total amount of clay in the earth formation adjacent the same portion of the borehole using an SP log and the equations:

$$E_{shaly\,sand} = -\frac{2RT}{F} \int_{m_1}^{m_2} \left[ \frac{t_{Na}^{hf} + R_w B(Q_v)_T}{1 + R_w B(Q_v)_T} \right] d \ln m\gamma_\pm$$

and $$E_{shale} = \frac{2RT}{F} \int_{m_2}^{m_1} d \ln m\gamma_\pm$$

where
- E = diffusion potential between sand/shaly sand and adjacent shale beds,
- T = temperature,
- F = the Faraday,
- R = molar gas constant,
- $t_{Na}^{hf}$ = Hittorf electrical transport number for sodium ion in aqueous solution,
- $R_w$ = geometric mean water resistivity (equal to the reciprocal of water conductivity, $C_w$),
- m and $\gamma_\pm$ = molality and mean ionic activity of sodium chloride electrolyte solutions,
- $m_1$ and $m_2$ = molalities of mud filtrate and formation brine, respectively,
- B = in-phase equivalent conductivity of the clay exchange cations, and
- $(Q_v)_T$ = total clay exchange capacity per unit pore volume; combining the results of said induced polarization log and said total clay measurement from said SP log to determine the fraction of the total clay content in the formation which is due to laminated clay;

performing said steps at a plurality of depths in the borehole; and recording the results of said combining step to produce a log thereof.

23. Apparatus for distinguishing dispersed and laminated clay in earth formations, comprising:

induced polarization measuring means for making an induced polarization measurement of the dispersed clay content of a portion of such an earth formation;

total clay measuring means for measuring the total amount of clay in the same earth formation; and combining means coupled to said measuring means for combining the results of said induced polarization measurement and said total clay measurement to determine the fraction of the total clay content in the formation which is due to laminated clay.

24. The apparatus of claim 23 wherein said induced polarization measuring means further comprises an induced polarization logging tool for measuring the earth formation in a borehole which penetrates the formation.

25. The apparatus of claim 23 wherein said total clay measuring means further comprises a borehole logging tool for measuring the clay in a borehole which penetrates the formation.

26. The apparatus of claim 23 wherein said induced polarization measuring means further comprises means for measuring a core sample of the earth formation by means of induced polarization measurements.

27. The apparatus of claim 23 wherein said total clay measuring means further comprises means for measuring the clay in a core sample of the earth formation.

28. The apparatus of claim 23 wherein said means for making an induced polarization measurement further comprises means for making multifrequency induced polarization measurements.

29. The apparatus of claim 28 wherein said means for making multifrequency induced polarization measurements further comprises means for making induced polarization measurements in the frequency domain.

30. The apparatus of claim 29 wherein said means for making multifrequency induced polarization measurements further comprises a multifrequency frequency domain induced polarization logging tool operated at at least one frequency less than 1 Hz.

31. The apparatus of claim 28 wherein said means for making multifrequency induced polarization measurements further comprises means for making induced polarization measurements in the time domain.

32. The apparatus of claim 31 further comprising means for transforming said time domain induced polarization measurements to the frequency domain.

33. The apparatus of claim 23 wherein said total clay measuring means further comprises a spontaneous potential (SP) tool.

34. The apparatus of claim 33 further comprising means for measuring the total amount of clay in the earth formation using the equations:

$$E_{shaly\,sand} = -\frac{2RT}{F} \int_{m_1}^{m_2} \left[ \frac{t_{Na}^{hf} + R_w B(Q_v)_T}{1 + R_w B(Q_v)_T} \right] d \ln m\gamma_{\pm}$$

and

-continued $$E_{shale} = \frac{2RT}{F} \int_{m_2}^{m_1} d \ln m\gamma_{\pm}$$

where

E = diffusion potential between sand/shaly sand and adjacent shale beds,

T = temperature,

F = the Faraday,

R = molar gas constant, $t_{Na}^{hf}$ = Hittorf electrical transport number for sodium ion in aqueous solution, $R_w$ = geometric mean water resistivity (equal to the reciprocal of water conductivity, $C_w$), m and $\gamma_{\pm}$ = molality and mean ionic activity of sodium chloride electrolyte solutions, $m_1$ and $m_2$ = molalities of mud filtrate and formation brine, respectively, B = in-phase equivalent conductivity of the clay exchange cations, and $(Q_v)_T$ = total clay exchange capacity per unit pore volume.

35. The apparatus of claim 23 wherein said total clay measuring means further comprises a Natural Gamma Ray log.

36. The apparatus of claim 35 further comprising means for measuring the total amount of clay in the earth formation using the equation:

$$(Q_v)_T = \frac{(a\gamma + b)\rho_M(1-\phi)}{\phi}$$

where $(Q_v)_T$ = total clay exchange capacity per unit pore volume, $\gamma$ = gamma ray deflection (API units) relative to clay-free formation, $\phi$ = porosity, a and b = constants calibrated from log or core data, and $\rho_M$ = rock matrix grain density.

37. The apparatus of claim 23 wherein said means for measuring the total amount of clay in the earth formation further comprises a Natural Gamma Ray Spectroscopy log.

38. The apparatus of claim 23 wherein said means for measuring the total amount of clay in the earth formation further comprises means for measuring the clay using the difference between neutron and density logs.

39. The apparatus of claim 38 further comprising means for measuring the total amount of clay in the earth formation using the equation:

$$(Q_v)_T = \frac{\phi_N - \phi_D}{\phi_D} \cdot C$$

where $(Q_v)_T$ = total clay exchange capacity per unit pore volume, $\phi_N$ = Neutron log porosity, $\phi_D$ = Density log porosity, C is a calibration constant given by the equation:

$$C = \frac{(CEC)_{T,dry} \cdot (\rho_{clay,dry})}{HI_{clay,dry}}$$

$(CEC)_{T,dry}$ = cation exchange capacity of the total clay mineral mixture in the formation in dry form, and $\rho_{clay,dry}$ and $HI_{clay,dry}$ = density and hydrogen index, respectively, of the dry clay mineral mixture in the formation, and C = constant calibrated from log and core data.

40. The apparatus of claim 23 wherein said means for measuring the total amount of clay in the earth formation further comprises means for measuring the clay using the dispersion of the dielectric constant between two different frequencies.

41. The apparatus of claim 40 wherein said means for measuring the clay using the dispersion of the dielectric constant between two different frequencies further comprises a multifrequency dielectric logging tool operating in the frequency range between substantially 1 and 300 MHz.

42. The apparatus of claim 23 further comprising means for recording the results of said clay fractional determinations to produce a log thereof.

43. Apparatus for distinguishing and separately measuring dispersed and laminated clay in earth formations penetrated by a borehole, comprising:

a multifrequency frequency domain induced polarization logging tool operated at at least one frequency less than 1 Hz for logging a portion of the borehole to measure the dispersed clay content thereof;

an SP logging tool for measuring the total amount of clay in the earth formation adjacent the same portion of the borehole, using the equations:

$$E_{shaly\ sand} = -\frac{2RT}{F} \int_{m_1}^{m_2} \left[ \frac{t_{Na}^{hf} + R_w B(Q_v)_T}{1 + R_w B(Q_v)_T} \right] d \ln m\gamma_\pm$$

and $$E_{shale} = \frac{2RT}{F} \int_{m_2}^{m_1} d \ln m\gamma_\pm$$

where
- E = diffusion potential between sand/shaly sand and adjacent shale beds,
- T = temperature,
- F = the Faraday,
- R = molar gas constant,
- $t_{Na}^{hf}$ = Hittorf electrical transport number for sodium ion in aqueous solution,
- $R_w$ = geometric mean water resistivity (equal to the reciprocal of water conductivity, $C_w$),
- m and $\gamma_\pm$ = molality and mean ionic activity of sodium chloride electrolyte solutions,
- $m_1$ and $m_2$ = molalities of mud filtrate and formation brine, respectively,
- B = in-phase equivalent conductivity of the clay exchange cations, and
- $(Q_v)_T$ = total clay exchange capacity per unit pore volume; means coupled to said logging tools for combining the results of said induced polarization log and said SP log to determine the fraction of the total clay content in the formation which is due to laminated clay; and means for recording the results of said clay fractional determinations to produce a log thereof.

* * * * *